(No Model.) 3 Sheets—Sheet 1.
H. POELL.
TINNER'S SEAMING MACHINE.
No. 338,187. Patented Mar. 16, 1886.
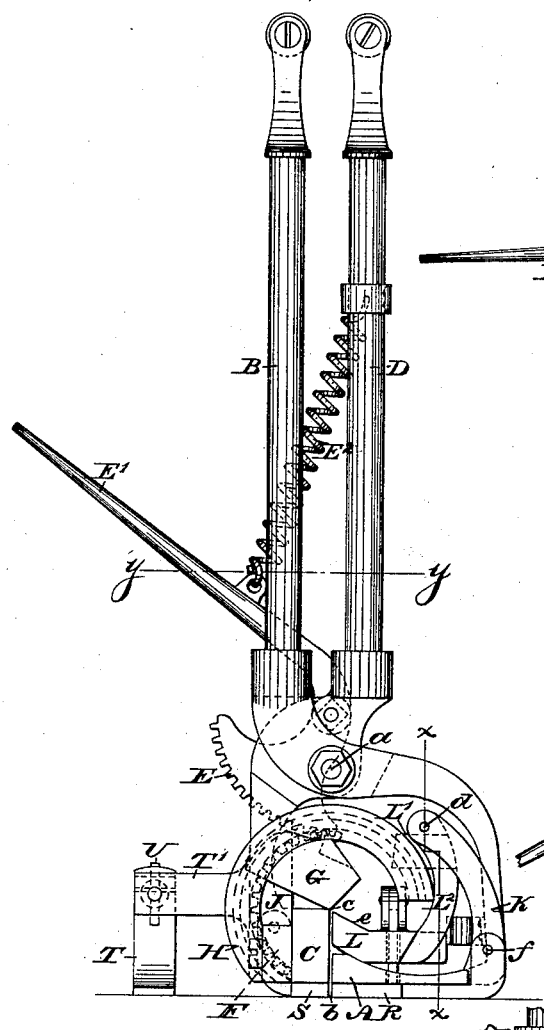
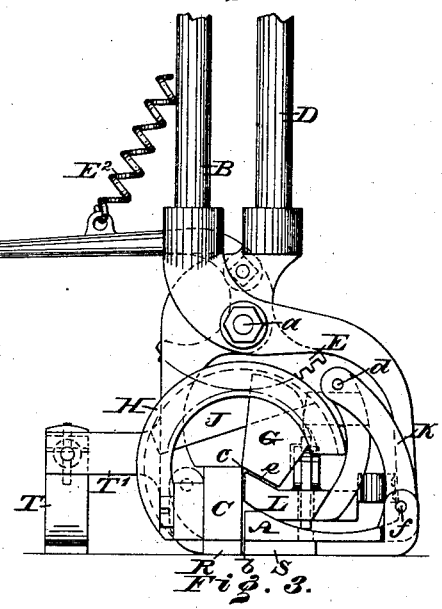
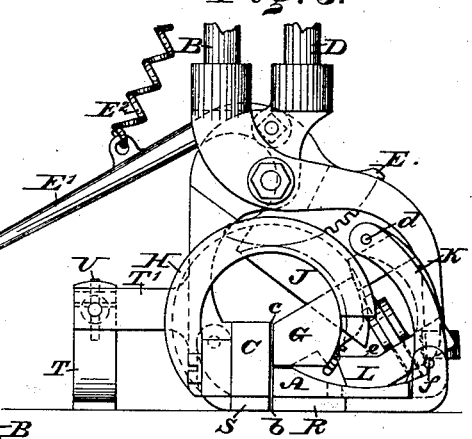
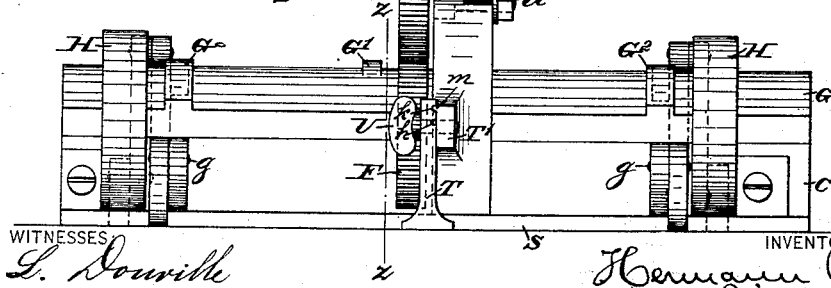
WITNESSES: L. Douville, W. F. Kirchen
INVENTOR: Hermann Poell
BY John A. Biedersheim, ATTORNEY.

(No Model.) 3 Sheets—Sheet 2.
H. POELL.
TINNER'S SEAMING MACHINE.
No. 338,187. Patented Mar. 16, 1886.
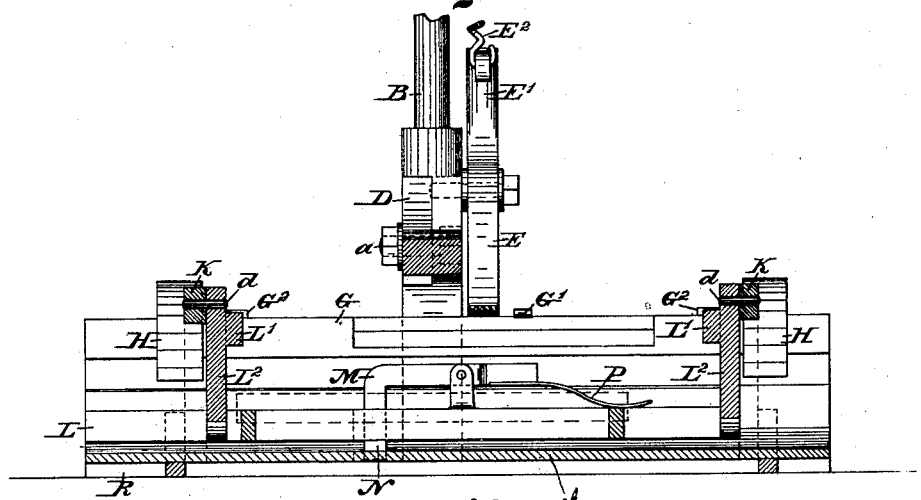
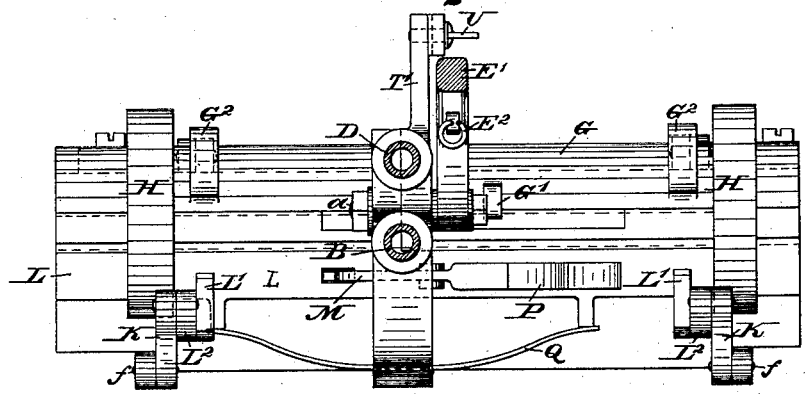
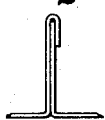
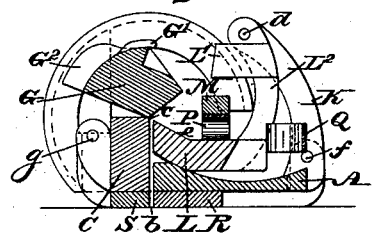
WITNESSES: L. Douville, W. F. Kircher
INVENTOR: Hermann Poell
BY John A. Wiedersheim
ATTORNEY.

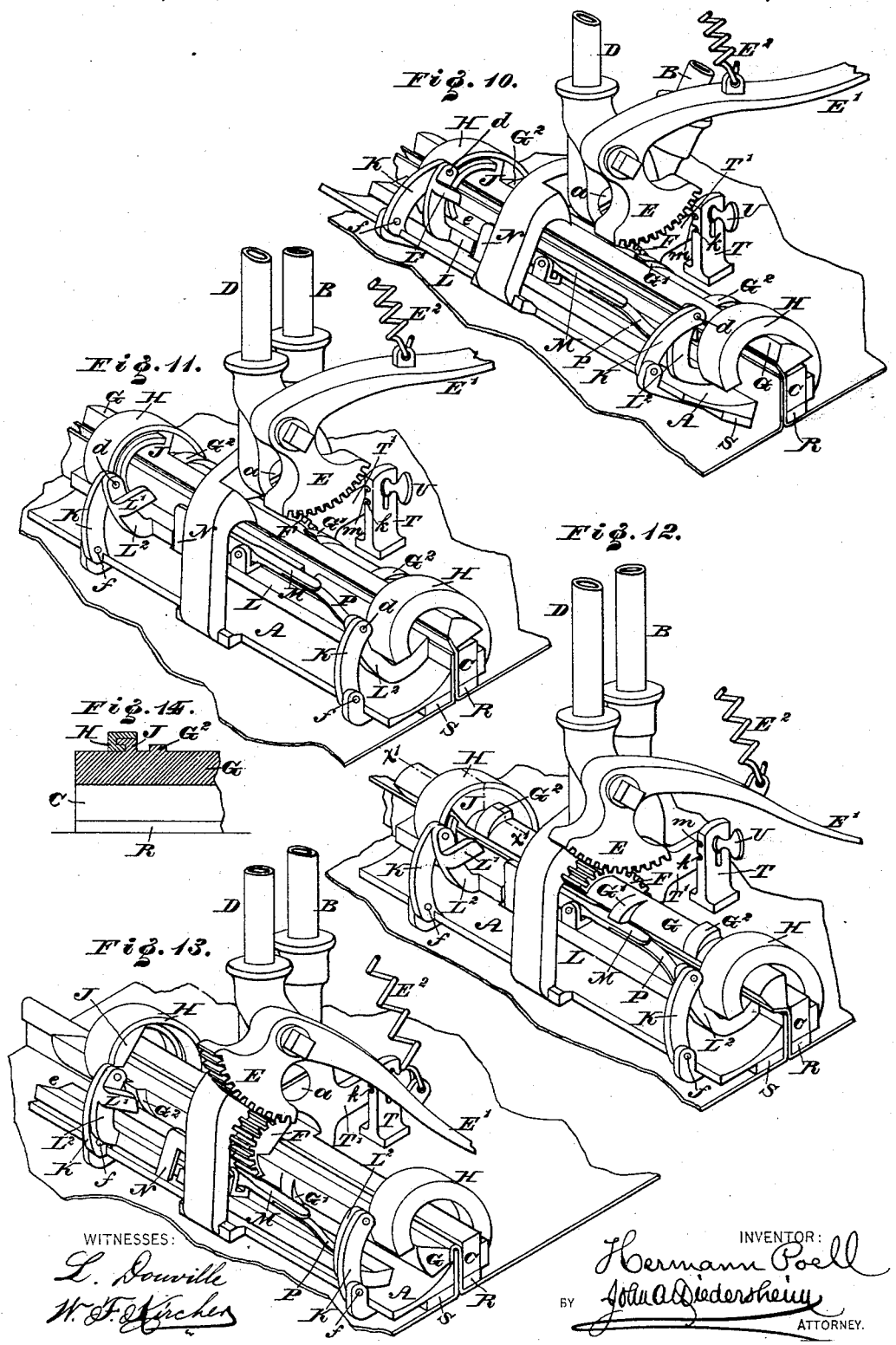

ated April 19, 1885. Serial No. 165,982. (No model.)

UNITED STATES PATENT OFFICE.

HERMANN POELL, OF PHILADELPHIA, PENNSYLVANIA, ASSIGNOR OF ONE-HALF TO HENRY GRUNER AND ANTON SCHMIDT, BOTH OF SAME PLACE.

TINNER'S SEAMING-MACHINE.

SPECIFICATION forming part of Letters Patent No. 338,187, dated March 16, 1886.

Application filed May 19, 1885. Serial No. 165,982. (No model.)

*To all whom it may concern:*

Be it known that I, HERMANN POELL, a citizen of the United States, residing in the city and county of Philadelphia, State of Pennsylvania, have invented a new and useful Improvement in Tinner's Seaming-Machines, which improvement is fully set forth in the following specification and accompanying drawings, in which—

Figure 1 represents a side elevation of a tinner's seaming-machine embodying my invention. Figs. 2 and 3 represent similar views, the machine being shown in different positions. Fig. 4 represents a rear view of the machine shown in Fig. 1. Fig. 5 represents a vertical section in line $x\ x$, Fig. 1. Fig. 6 represents a horizontal section in line $y\ y$, Fig. 1. Fig. 7 represents a vertical section in line $z\ z$, Fig. 4. Figs. 8 and 9 represent end views of the same as it leaves the machine. Fig. 10 represents a perspective view of the machine as opened and placed over sheets to be seamed, the handles being broken away and a spring, hereinafter lettered Q, removed. Fig. 11 represents a similar view showing the machine closed and the jaws thereof clamped upon the sheets. Fig. 12 represents a similar view showing the machine closed and the jaws thereof clamped upon the sheets, and a crimper, hereinafter lettered G, partly rotated and partly bending one of the ends of the sheets to be seamed. Fig. 13 represents a view similar to Fig. 12, excepting that the crimper G has been rotated to full extent, fully bending the end of one sheet on the other. Fig. 14 represents a vertical section of a portion in line $x'\ x'$, Fig. 12.

Similar letters of reference indicate corresponding parts in the several figures.

My invention consists of a machine by means of which the seam in joining metal, more generally employed in tin roofing, receives one complete crimp or bend at each operation of the machine.

It further consists of details of construction, as will be hereinafter fully described.

Referring to the drawings, A represents the bed of the machine, to which is secured a stationary handle, B, partly to readily move the machine and partly to steady the same during the operation of crimping.

C represents a jaw, which is adapted to be moved toward and from the bed A by means of the handle D, the handle D being pivoted to the handle B, as at $a$.

Pivoted to the lower end of the handle D is a segmental gear, E, which meshes with a segmental gear, F, the latter being secured to or being a portion of a bender or crimper, G, said crimper being journaled to the jaw C by means of segmental pieces H, secured to said jaw C, and in which move blocks J, which form a part of the crimper G, the axis being in a line at the top and right of the jaw C, as at $c$, (see Figs. 1, 2, and 3,) where the edge of the crimper G meets said jaw C.

Arms K are secured to the bed A, and are for the purpose of carrying the shaper L, which is journaled to said arms K at $d$, it being noticed that the shaper has an oblique face, $e$. The shaper carries a dog, M, whose nose N passes through the shaper into the bed, said dog being held in position by a spring, P.

On the crimper G is a projection or lug, G', adapted to engage with the dog M on the shaper, the latter being returned to its normal position by a spring, Q. The crimper G also carries lugs $G^2$, which are adapted to strike lugs L', attached to arms $L^2$, by which latter the shaper L is journaled to the arms K of the bed or frame A. Also journaled to the arms K, as at $f$, and journaled to the jaw C, as at $g$, are "raisers" or pieces R and S, respectively adapted to be moved from under the machine and lower the same, in order to make the second crimp—that is, to do the work of double-crimping—as may be more readily seen in Fig. 9. A support or rest, T, whose purpose is to steady the machine, is secured to the rear thereof, and retained by a thumb-screw, U. Notches $h\ h$ on the rest receive a projection, $m$, on the arm T', to which the rest is attached, for locating and steadying the same. (See Fig. 4.)

The operation is as follows: The flanges of the tin brought together, as shown by the dotted lines below Fig. 7, are placed between the bed A and jaw C, as at $b$, the longer of the flanges resting against the jaw C. The handles B D are now brought together, thus firmly clamping the two flanges, and the segmental gear E, operated by means of its handle E'. (See Fig. 1.) It will be seen (referring to Fig. 2) that by partly depressing the handle E' the longer of the flanges is partially bent over the shorter of the flanges against the face $e$ of the shaper L. The motion of the handle E' is continued, causing the lug G' to strike the dog M, and thus release the nose N and unlock the shaper, leaving it free to move on its bearings $d$. The lugs $G^2$ now engage with the lugs $L^2$ on the arms L', and thus move the shaper L out of the path of the tin to be bent. The motion of the handle E' is continued, and thus the portion of the tin bent over is brought down parallel to its former position, thus making a complete crimp. (See Fig. 8.) The parts are now restored to their normal position by returning the handle E', which is assisted by the spring $E^2$. The raisers S and T are next swung from under the machine, the rest T moved from the notch $k$ to the notch $h$, the crimp placed between the bed A and jaw C by aid of the handles B D, and the operation above described repeated, the result whereof is the forming of a complete seam, as seen in Fig. 9.

Having thus described my invention, what I claim as new, and desire to secure by Letters Patent, is—

1. A seaming-machine composed of a bed having a stationary handle, a movable jaw having a handle pivoted to said stationary handle, a crimper journaled to said jaw and operated by means of segmental racks and a lever connected therewith, and a shaper provided with a dog and pivotally connected to said bed and provided with raisers, all of said parts being arranged, combined, and operated substantially as described.

2. A bed provided with a stationary handle, the jaw C, a crimper having a rack and journaled in segmental pieces secured to said jaw, and a lever pivoted to said pivoted handle and carrying a rack meshing with the rack of said crimper, substantially as described.

3. The bed A and jaw C, having the handle D, in combination with the pivoted lever E', having the rack E, the crimper G, having a rack, F, meshing with the rack E, and spring $E^2$, substantially as described.

4. A crimper, G, a jaw, C, segmental pieces H, and blocks J, combined and operating substantially as and for the purpose set forth.

5. The bed A, having an aperture therein to receive the nose of the dog M, and provided with arms K, in combination with shaper L, having a dog, M, and arms $L^2$, said arms being journaled to said arms K, and crimper G, having lugs G', substantially as and for the purpose set forth.

6. A shaper carrying a dog, M, having a nose which passes through said shaper into the bed of the machine, substantially as and for the purpose set forth.

7. The crimper G, provided with a projection, G', and lugs $G^2$, the dog M, arms $L^2$, bed A, and shaper L, combined and operating substantially as described.

8. The arms K, bed A, and the jaw C, in combination with the raisers R and S, which are journaled, respectively, to said arms and jaw, substantially as and for the purpose set forth.

9. In combination with the bed A, having handle B, and jaw C, having handle D, the rest T, connected with the arm T' of the jaw C and provided with notches $h\ k$, and the screw U, said arm T' having a projection or tongue, M, substantially as described.

10. The bed A, handle B, jaw C, handle D, lever E', toothed segments E F, and crimper G, combined and operating substantially as and for the purpose set forth.

11. The jaw C, segmental pieces H, blocks J, crimper G, having lug G', arms K, and shaper L, dog M, bed A, having an aperture therein, springs P Q, and arms L', combined and operating substantially as and for the purpose set forth.

12. The bed A, handle B, jaw C, handle D, lever E', toothed segments E F, crimper G, having lug G', segmental pieces H, blocks J, arms K, shaper L, dog M, springs P Q, and arms L', bed A having an aperture therein, combined and operating substantially as and for the purpose set forth.

13. The bed A, having an aperture therein, handles B D, jaw C, toothed segments E F, crimper G, having lug G', segmental pieces H, blocks J, arms K, shaper L, dog M, springs P Q, arms L', and raisers R S, combined and operating substantially as and for the purpose set forth.

H. POELL.

Witnesses:
    JOHN A. WIEDERSHEIM,
    A. P. GRANT.